United States Patent
Jin et al.

(10) Patent No.: US 7,950,508 B2
(45) Date of Patent: May 31, 2011

(54) PISTON VALVE ASSEMBLY OF CONTINUOUS DAMPING CONTROL DAMPER

(75) Inventors: Min-Ho Jin, Jinju-si (KR); Dong-Rak Lee, Busan (KR); Tae-Ho Kang, Busan (KR)

(73) Assignee: S & T Daewoo Co., Ltd., Gijang-Gun, Busan (KR)

( * ) Notice: Subject to any disclaimer, the term of this patent is extended or adjusted under 35 U.S.C. 154(b) by 781 days.

(21) Appl. No.: 11/948,122

(22) Filed: Nov. 30, 2007

(65) Prior Publication Data

US 2009/0071774 A1    Mar. 19, 2009

(51) Int. Cl.
F16F 9/32    (2006.01)
F16F 9/53    (2006.01)

(52) U.S. Cl. ............... 188/322.22; 188/267.2; 92/181 P

(58) Field of Classification Search ............. 188/267, 188/267.1, 267.2, 322.22; 92/181 R, 181 P, 92/183, 184

See application file for complete search history.

(56) References Cited

U.S. PATENT DOCUMENTS

| | | | |
|---|---|---|---|
| 4,791,712 A | 12/1988 | Wells | |
| 5,038,897 A | 8/1991 | Wells | |
| 5,388,677 A | 2/1995 | Rosch | |
| 6,612,409 B2 * | 9/2003 | Lun et al. | 188/267.2 |
| 6,637,556 B1 * | 10/2003 | Lun | 188/267 |
| 6,655,511 B1 * | 12/2003 | Lun et al. | 188/267 |
| 6,874,603 B2 * | 4/2005 | Lisenker et al. | 188/267.2 |
| 7,753,180 B2 * | 7/2010 | Lun | 188/267.2 |
| 2001/0032763 A1 | 10/2001 | Naples et al. | |
| 2004/0118646 A1 * | 6/2004 | Lun | 188/267 |

FOREIGN PATENT DOCUMENTS

| | | |
|---|---|---|
| DE | 4226180 | 2/1994 |
| DE | 19635988 | 4/1998 |
| EP | 1437526 | 7/2004 |
| GB | 2052012 | 1/1981 |
| WO | WO 0053950 | 9/2000 |

OTHER PUBLICATIONS

European Search Report and Examination Report for EP 07121285.6 issued by the European Patent Office (9 pages).

* cited by examiner

*Primary Examiner* — Thomas J Williams
(74) *Attorney, Agent, or Firm* — Baker & Daniels LLP

(57) ABSTRACT

The present invention relates to a piston valve assembly which is used in a continuous damping control damper using magneto-rheological fluid. The piston valve assembly is coupled with an end of the piston rod, and a stopper having a flat upper surface which is surface-contacted with an upper plate is disposed between a core assembly and the upper plate, thereby properly dispersing a force applied to the piston rod. According to the present invention, the reliability and stability in the coupling between the piston rod and the piston valve assembly can be increased, thereby stably controlling the damping force of the damper. Further, the slot is formed in the core of the piston valve assembly so as to reduce the damping force in the lower speed range, thereby considerably improving the driving comport of a vehicle.

4 Claims, 10 Drawing Sheets

- Prior Art -

- Prior Art -

- Prior Art -

PISTON VALVE ASSEMBLY OF CONTINUOUS DAMPING CONTROL DAMPER

BACKGROUND OF THE INVENTION

This application claims the benefit of Korean Patent Application No. 10-2007-0094296, filed on Sep. 17, 2007, in Korea, which is hereby incorporated by reference for all purposes as if fully set forth herein.

FIELD OF THE INVENTION

The present invention relates to a piston valve assembly and more particularly, to a piston valve assembly which is used in a continuous damping control damper using magneto-rheological fluid.

DISCUSSION OF THE RELATED ART

In general, a suspension is provided between a car body and a wheel so as to improve driving comports. The suspension includes a chassis spring for absorbing vibration and shock from a road surface, and a damper for damping free vibration of the chassis spring.

The damper functions to absorb the free vibration of the chassis spring by converting vertical kinetic energy into heat energy, thereby rapidly damping the free vibration of the chassis spring.

Recently, in a high-class motorcar, there is widely used an active controlled suspension system which detects a body status of the car and then feeds back the detecting results so as to electronically control a damping force of the damper.

As one of various methods of electronically controlling the damping force of the damper, there is generally used a method in which a fluid passing hole is formed in a piston valve reciprocating in a cylinder and the movement of fluid through the fluid passing hole is adjusted.

The method of adjusting the movement of fluid through the fluid passing hole is classified into a way of adjusting a sectional area of the fluid passing hole using a spring and a way that fills electro-rheological fluid or magneto-rheological fluid in the cylinder and then adjusts a flowing resistance of the fluid using an electronic or magnetic property of the fluid.

As shown in FIG. 1, a damper 10 using the magneto-rheological fluid (MR fluid) includes a cylinder 20 of which one end is opened and which is formed with a hollow portion therein; a piston rod 40 which is inserted through an upper portion of the cylinder 20; a piston valve assembly which is connected with a lower end of the piston rod 40 so as to reciprocate in the cylinder 20.

Further, at a lower side of the piston valve assembly 30, there is provided a floating piston 15 for compensating a volume change due to the movement of the piston rod 40. And high pressure nitrogen gas is filled in a space at a lower side of the floating piston 50.

A rod guide 60 is coupled to an upper end of the cylinder 20 so as to close an entrance of the cylinder 20 and also to guide the up/down movement of the piston rod 40.

An internal portion of the cylinder 20 is divided into a lower compressive chamber and an upper tensile chamber, on the basis of the piston valve assembly 30, and the MR fluid is filled in the compressive chamber and the tensile chamber.

The MR fluid contains metallic particles of about 3~10 μm and has a property that an apparent viscosity thereof is changed by magnetic field generated around it. Using the property, a damping force (compression force and tensile force) of the damper 10 can be controlled by applying the magnetic field to the MR fluid which is flowed into the compressive chamber and the tensile chamber through the piston valve assembly 30 and thus changing the apparent viscosity.

As shown in FIGS. 2 and 3, the piston valve assembly 30 includes a core assembly 31 which is fixed to a lower end of the piston rod 40 and provided with a solenoid coil, an upper plate 32 which is disposed at an upper side of the core assembly 31, a lower plate 33 which is disposed at a lower side of the core assembly 31, and a flux ring 34 which wraps the core assembly 31.

The flux ring 34 provides a path for the magnetic field generated from the solenoid coil of the core assembly 31, and the upper and lower plates 32 and 33 function to prevent the magnetic field from exerting an influence on the compressive chamber and the tensile chamber.

The flux ring 34 also wraps side and upper surfaces of each of the upper and lower plates 32 and 33 as well as the core assembly 31, so that the upper plate 32 is closely contacted with an upper surface of the core assembly 31 and the lower plate 33 is closely contacted with a lower surface of the core assembly 31.

Further, a gap is formed between the fluxing ring 34 and the core assembly 31 so that the MR fluid can be passed through the gap, and the upper and lower plates 32 and 33 are respectively formed with a fluid passing hole 35, 36 which is communicated with the gap.

Meanwhile, in order to couple a lower end of the piston rod 40 to the piston valve assembly 30, there is formed a coupling groove 42 along an outer circumference of the piston rod 40. A ring-shaped key 37 having a circular section is coupled to the coupling groove 42.

And by placing the key 37 between the upper plate 32 and the core assembly 31, the upper plate 32 and the piston rod 40 are coupled to each other. And the core assembly 31 and the upper and lower plates 32 and 33 are integrally coupled by the flux ring 34, thereby coupling the piston valve assembly 30 and the piston rod 40.

A connecting cable 70 is installed in the piston rod 40, and the connecting cable 70 is extended through the lower end of the piston rod 40 and then connected to the solenoid coil of the core assembly 31.

A lower surface of the upper plate 32 has to be closely contacted to the core assembly 31 and the key 37 upon the coupling process. To this end, on a lower portion of an internal circumference of a penetrated portion of the upper plate 32, in which the piston rod 40 is inserted, there is formed a groove portion 38 in which a part of the key 37 is inserted.

However, in the structure, since the tensile force of the piston rod 40, which is generated upon a tensile stroke, is concentrated on the key 37 and the groove portion 38 of upper plate 32, there is problem that the key 37 and the groove portion 38 are worn away each other while they are used for a long time, thereby deteriorating the reliability in coupling between them. In the worst case, the key 37 or the groove portion 38 of upper plate 32 is damaged, and thus the piston rod 40 may be separated from the piston valve assembly 30 (concretely, from the upper plate 32).

Furthermore, if there is formed a clearance between the key 37 and the groove portion 38 by the wear and tear, there is another problem that the controlling of the damping force of the damper 10 becomes unstable.

Meanwhile, the damping force of the damper 10 is generally controlled by changing the intensity of current applied to the solenoid coil of the piston valve assembly 30 according to a relative distance between a vehicle body and an axle.

Therefore, if the relative distance between the vehicle body and the axle is always constant, the damping force is also maintained constantly.

However, in order to improve the driving comports of a vehicle, it is necessary to change the damping force of the damper 10 according to a speed of the vehicle. Particularly, if the damping force of the damper 10 is so large in a lower speed range, the driving comport is lowered.

Accordingly, there is a necessity for a design component which can control a damping property of the damper 10 in the lower speed range.

SUMMARY OF THE INVENTION

It is an object of the present invention to provide a piston valve assembly of a continuous damping control damper in which the reliability in coupling between the piston rod and the piston valve assembly is increased, thereby stably controlling the damping force of the damper.

It is an object of the present invention to provide a piston valve assembly having a damping property which is capable of improving the driving comports of a vehicle in the lower speed range.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a piston valve assembly which is coupled to an end of a piston rod inserted into a cylinder of a continuous damping control damper, comprising a core assembly which has a solenoid coil therein; a stopper which is fixed to the piston rod at an upper side of the core assembly, and provided with a body which is formed with a through-hole in which the piston rod is inserted, and a supporting portion which is protruded from an upper end of the body to an outside so as to have a larger diameter than the body and also have a flat upper surface; an upper plate which is coupled with the piston rod at an upper side of the stopper and also formed with a stopper receiving portion at a lower surface thereof, which is surface-contacted with the supporting portion of the stopper; a lower plate which is placed at a lower side of the core assembly; and a flux ring which receives the core assembly, the upper plate and the lower plate therein, and of which an upper end supports a peripheral portion of an upper surface of the upper plate, and of which a lower end supports a peripheral portion of a lower surface of the lower plate.

Preferably, a lower end of the body of the stopper is plastic-deformed and then inserted into a coupling groove formed at an outer surface of the piston rod so that the stopper is fixed to the piston rod.

Preferably, the core assembly comprises a core comprising a winding portion, upper and lower protruded portions which are respectively formed at upper and lower ends of the winding portion to have a larger diameter than the winding portion, and a slot which is longitudinally formed at each of the upper and lower protruded portions; and a solenoid coil which is wound on the winding portion of the core.

Preferably, the plurality of slots are formed at each of the upper and lower protruded portions, and each slot of the upper protruded portion and each slot of the lower protruded portion are arranged to be correspondent to each other.

Further, the present invention provides a piston valve assembly which is coupled to an end of a piston rod inserted into a cylinder of a continuous damping control damper, comprising a core assembly which comprises a core having a winding portion, upper and lower protruded portions which are respectively formed at upper and lower ends of the winding portion to have a larger diameter than the winding portion, and a slot which is longitudinally formed at each of the upper and lower protruded portions and a solenoid coil which is wound on the winding portion of the core; an upper plate which is placed at an upper side of the core assembly; a lower plate which is placed at a lower side of the core assembly; and a flux ring which receives the core assembly, the upper plate and the lower plate therein, and of which an upper end supports a peripheral portion of an upper surface of the upper plate, and of which a lower end supports a peripheral portion of a lower surface of the lower plate.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
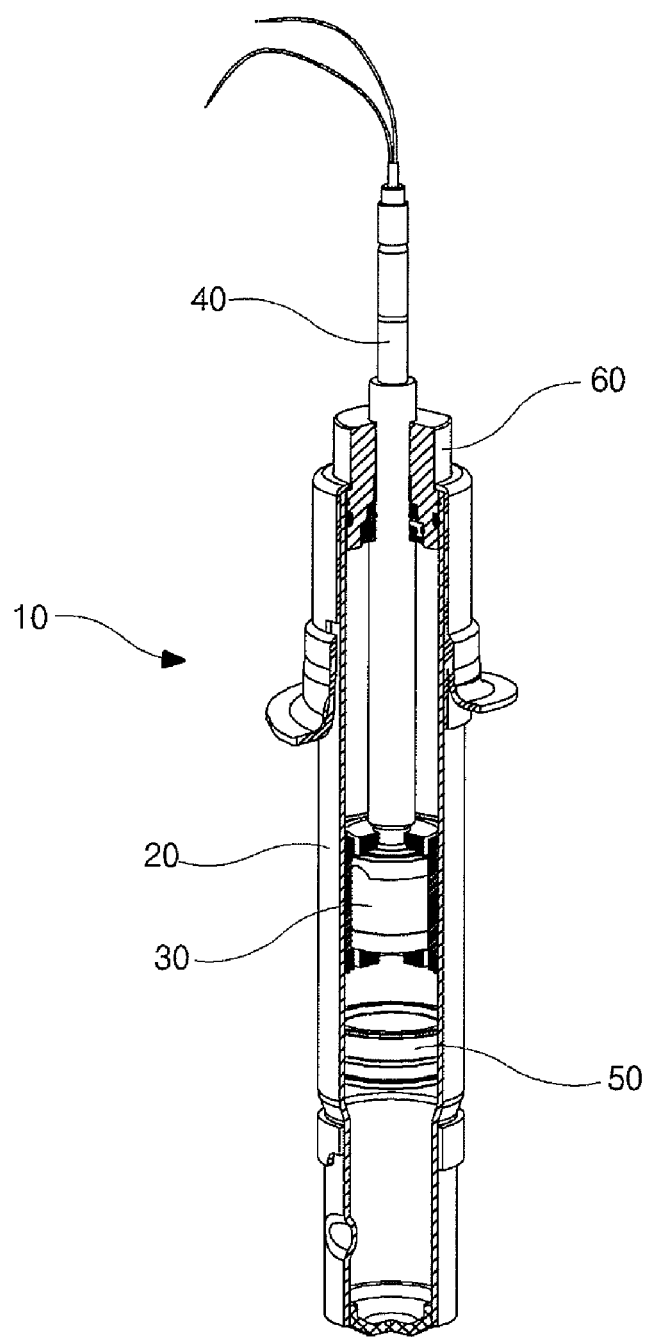
FIG. 1 is a cross-sectional view showing a construction of a conventional MR damper.
Figure 2:
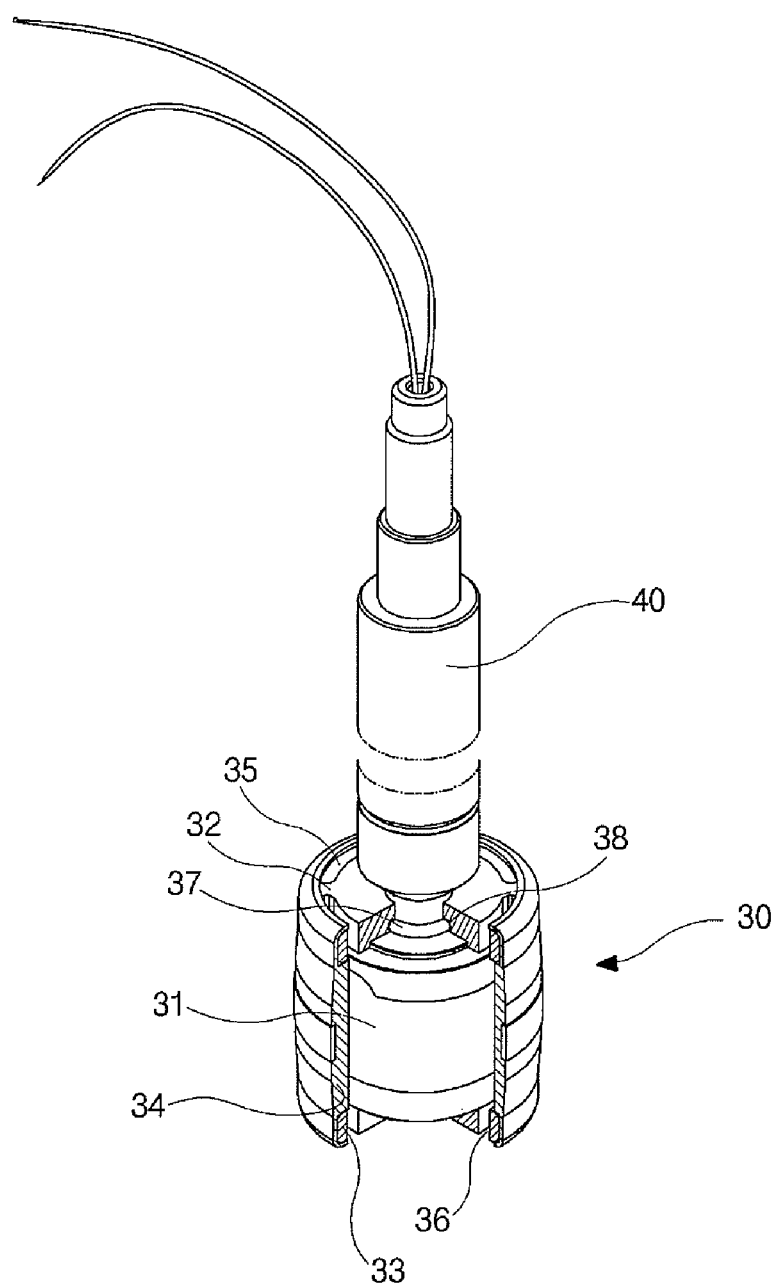
FIG. 2 is a perspective view, partially cutaway, of a conventional piston valve assembly.
Figure 3:
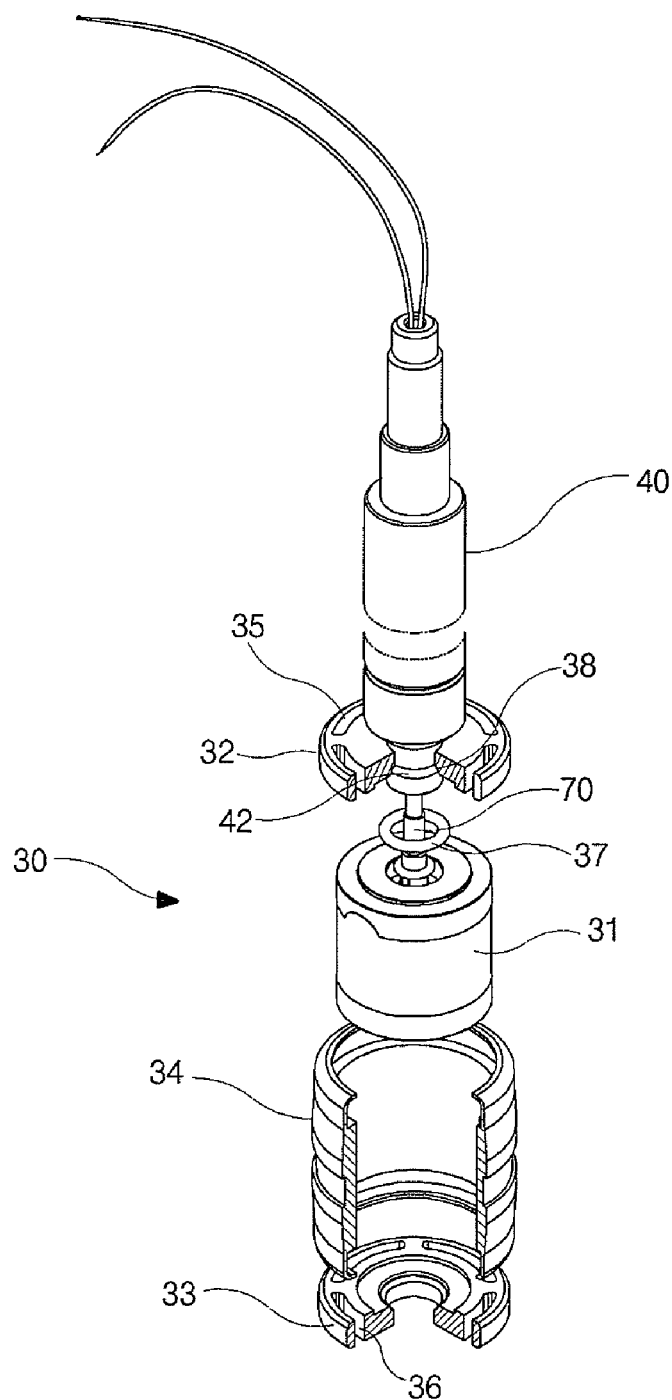
FIG. 3 is an exploded perspective view of the conventional piston valve assembly.
Figure 4:
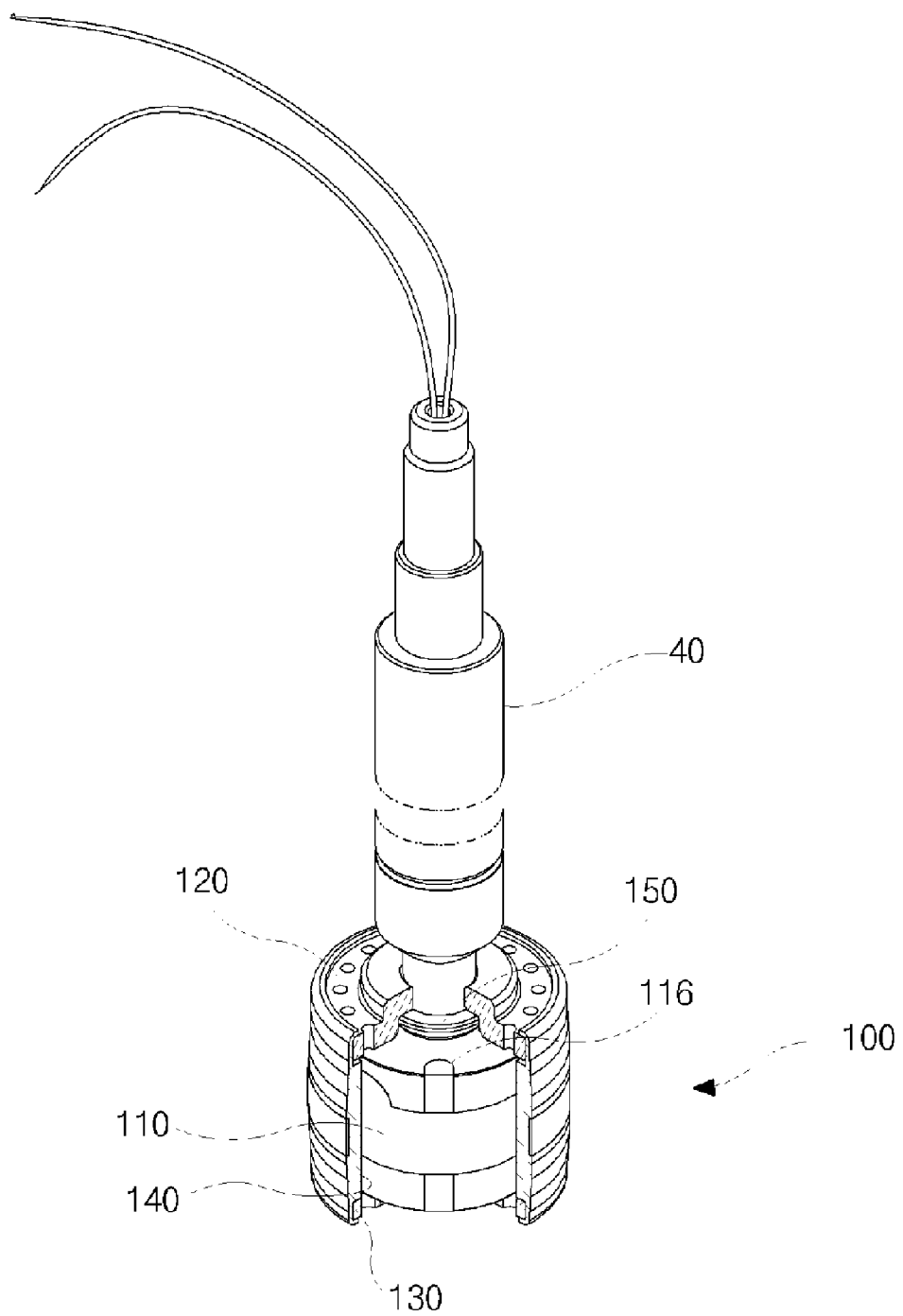
FIG. 4 is a perspective view, partially cutaway, of a piston valve assembly according to an embodiment of the present invention.
Figure 5:
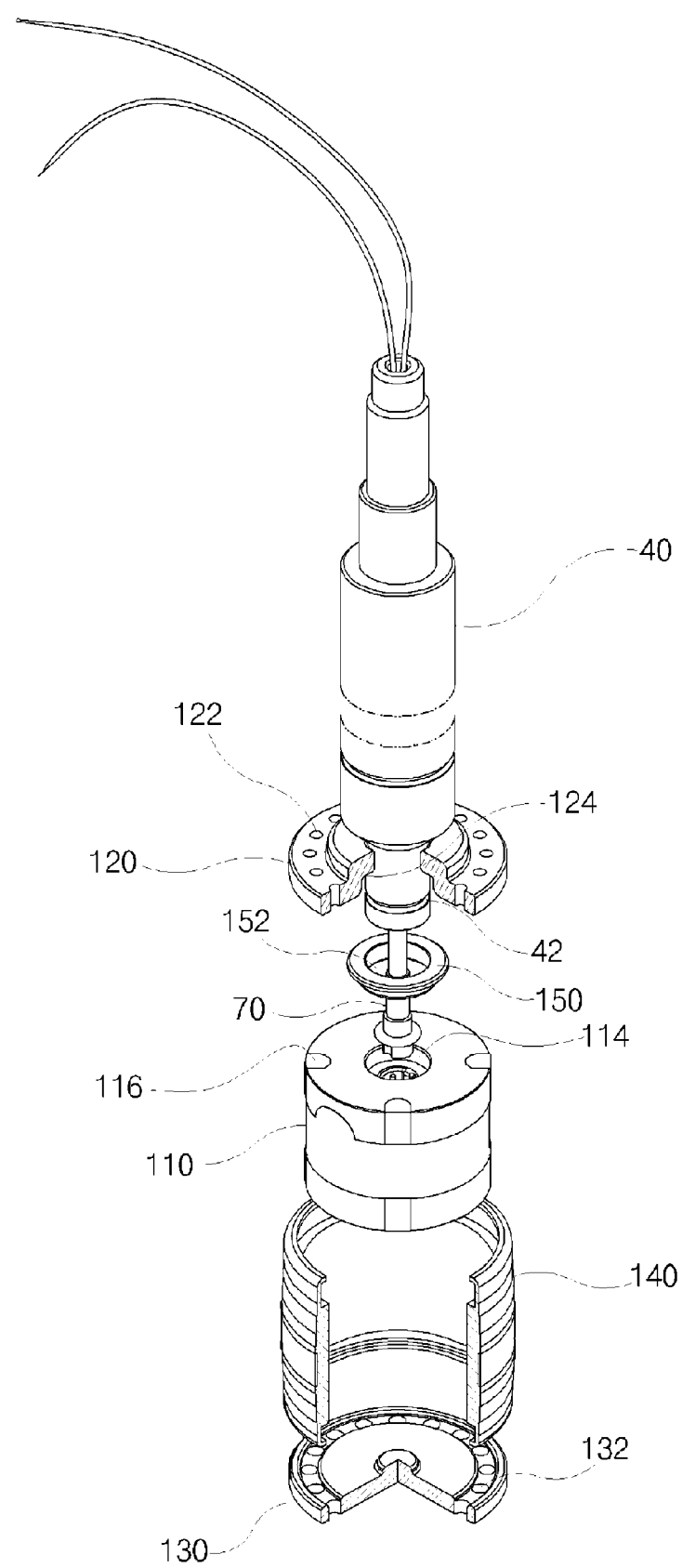
FIG. 5 is an exploded perspective view of the piston valve assembly according to the embodiment of the present invention.

As shown in FIGS. 4 and 5, a piston valve assembly 100 according to the present invention includes a core assembly 110 which is fixed to a lower end of the piston rod 40 and provided with a solenoid coil, an upper plate 120 which is placed at an upper side of the core assembly 110, a lower plate 130 which is placed at a lower side of the core assembly 110, and a flux ring 140 which receives the core assembly 110, the upper plate 120 and the lower plate 130 therein.

On an upper surface of the core assembly 110, there is formed a rod coupling groove 114 in which the lower end of the piston rod 40 and a connecting cable 70 are inserted. The upper and lower plates 120 and 130 are respectively formed with a fluid passing hole 122, 132.

Particularly, the embodiment of the present invention is characterized by using a stopper 150 in order to more stably couple the piston rod 40 and the core assembly 110.

The stopper 150 is disposed between the upper plate 120 and the core assembly 110, and a lower end of the stopper 150 is fixedly inserted into a coupling groove 42 which is formed along an outer surface of the piston rod 40.

Figure 6:
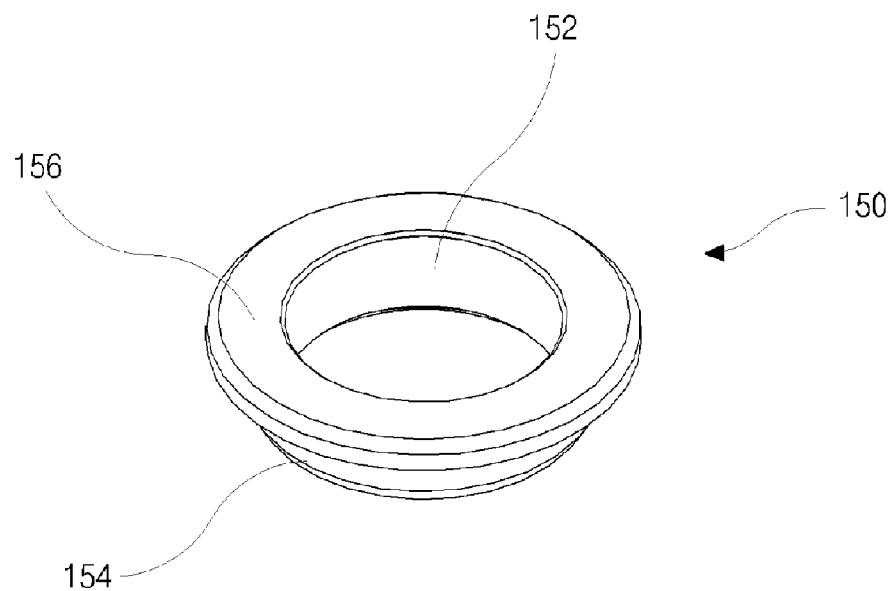
FIG. 6 is a perspective view of a stopper according to the embodiment of the present invention.

As shown in FIG. 6, the stopper 150 includes a body 154 which is formed with a through-hole 152 in which the piston rod 40 is inserted, and a supporting portion 156 which is protruded from an upper end of the body 154 to the outside so as to have a larger diameter than the body 154 and also have a flat upper surface.

Comparing with the conventional key, since the stopper 150 has a large contact surface with the upper plate 120, it is possible to properly disperse a pressure which is applied to the upper plate 120 by an up/down movement of the piston rod 40, thereby improving the reliability in coupling between the piston rod 40 and the piston valve assembly 100.

Figure 7:
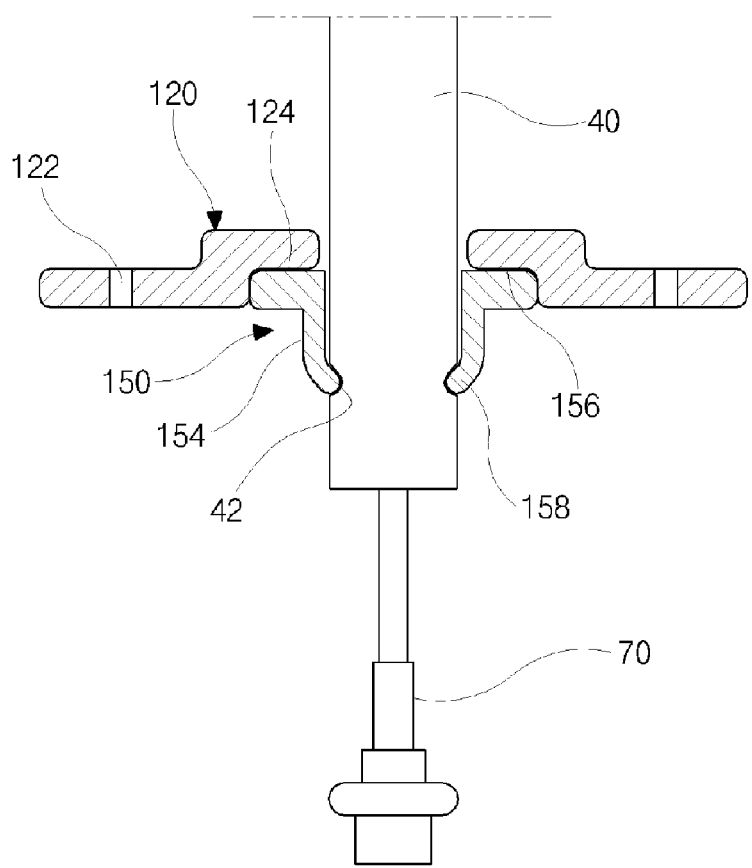
FIG. 7 is a cross-sectional view showing a coupling status between an upper plate and a stopper.

FIG. 7 is a cross-sectional view showing a coupling status between the upper plate 120 and the stopper 150 in the piston valve assembly 100 according to the embodiment of the present invention.

Herein, a stopper receiving portion 124 is formed at a lower surface of the upper plate 120 so as to have a concave shape, and a ceiling portion of the stopper receiving portion 124 is formed to be flat.

Therefore, when assembling the piston valve assembly 100, the supporting portion 156 of the stopper 150 is inserted into the stopper receiving portion 124 of the upper plate 120, and the flat upper surface of the supporting portion 156 is surface-contacted with the flat ceiling portion of the stopper receiving portion 124, thereby increasing the strength and reliability in the coupling between them.

The stopper 150 is fixed to the piston rod 40. In the embodiment of the present invention, a lower end 158 of the body 154 of the stopper 150 is plastic-deformed and then fixedly inserted into the coupling groove 42 of the piston rod 40.

Meanwhile, the piston valve assembly 100 according to the embodiment of the present invention is characterized by using a new type core assembly 110 in order to improve the driving comports in a lower speed range.

Figure 8A:
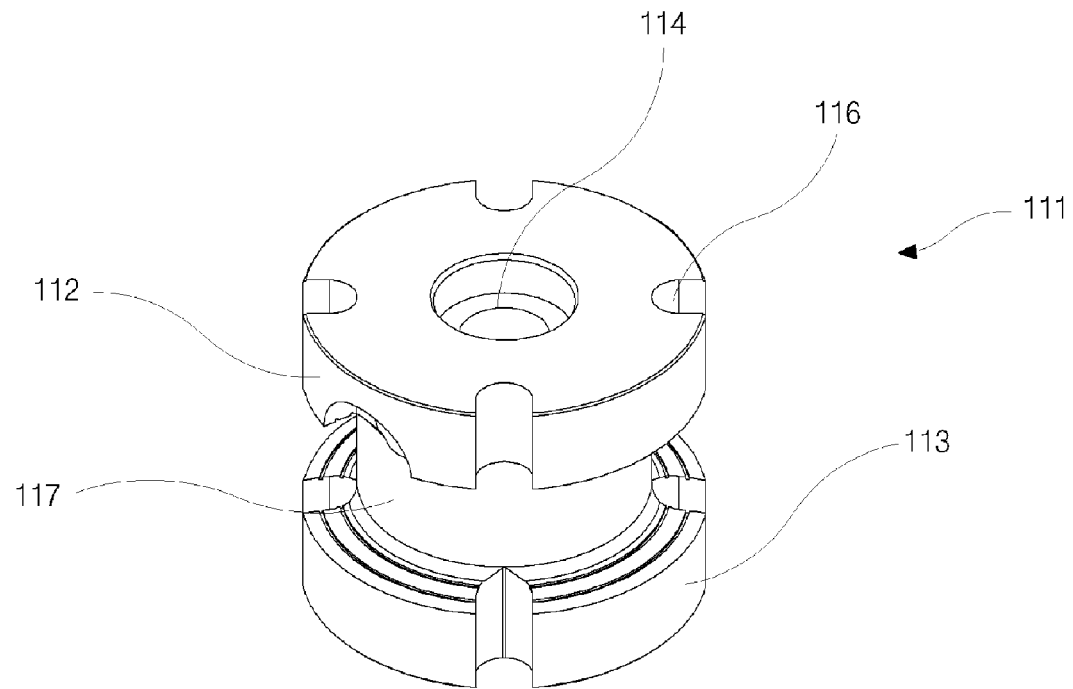
FIGS. 8A to 8C are views showing fabricating processes of the piston valve assembly.

The core assembly 110 is provided with a core on which a solenoid coil is wound and fabricated as follows:

First of all, as shown in FIG. 8A, the core 111 is fabricated by mechanically treating a metallic material.

The core 111 includes a winding portion 117 on which the solenoid coil is wound, and upper and lower protruded portions 112 and 113 which are respectively formed at upper and lower ends of the winding portion 117 to have a larger diameter than the winding portion 117.

In a center portion of the upper protruded portion 112, there is formed the rod coupling groove 114 in which the lower end of the piston rod 40 and the connecting cable 70 are inserted.

A plurality of slots 116 are longitudinally formed at a side surface of each of the upper and lower protruded portions 112 and 113, and each slot 116 of the upper protruded portion 112 and each slot 116 of the lower protruded portion 113 are arranged to be correspondent to each other. That is, one slot 116 of the upper protruded portion 112 and one slot 116 of the lower protruded portion 113 are disposed in the same longitudinal line.

Figure 8B:
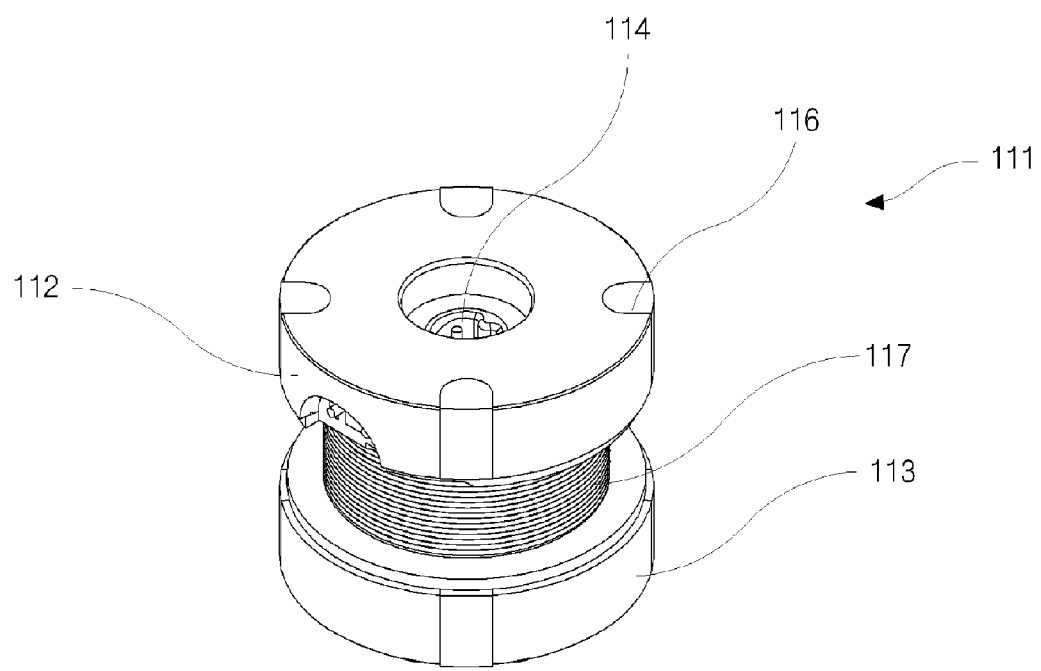

Then, as shown in FIG. 8B, a plastic coating layer is formed on a surface of the core 111 through a first injection process, and each slot 116 is filled with a plastic material. Further, in the first injection process, an arrangement groove is formed on an outer surface of the winding portion 117 so that the solenoid coil to be wound can be positioned in place.

Figure 8C:
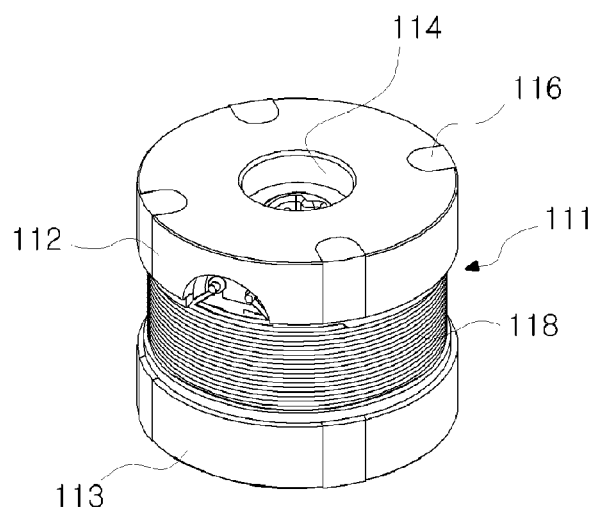

Then, as shown in FIG. 8C, the solenoid coil 118 is wound on the winding portion 117, and another plastic coating layer is formed on the outside of the wound solenoid coil 118 through a second injection process.

Meanwhile, due to the plurality of slots 116 formed around the core 111, the intensity of magnetic field generated by the current applied through the connecting cable 70 is weakened around the slots 116. Therefore, the damping force by the MR fluid passing through the clearance between the core assembly 110 and the flux ring 140 is reduced compared with the case that the slots 116 are not formed.

Figure 9:
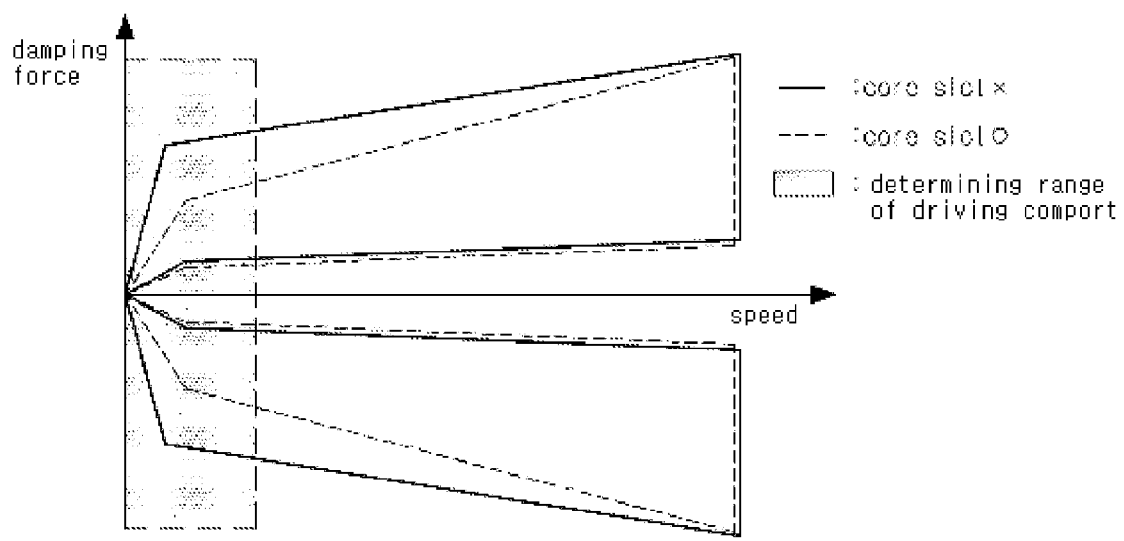
FIG. 9 is a graph showing a damping property according to presence and absence of a slot.
Figure 10A:
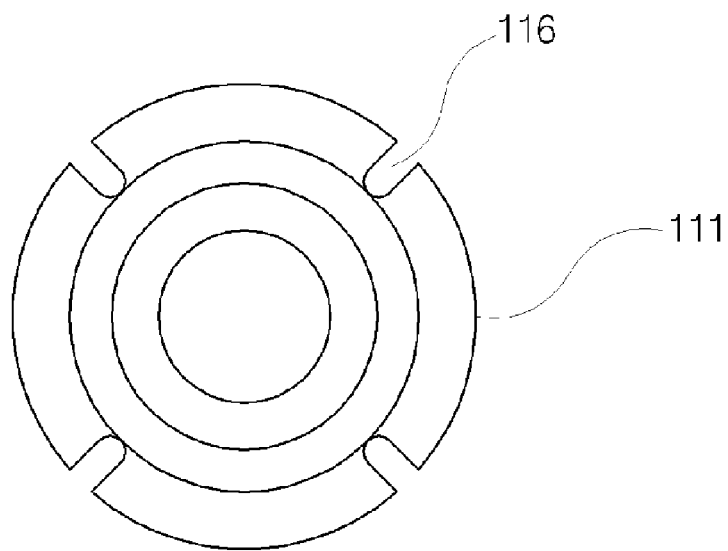
FIGS. 10A to 10D are views showing various slots formed in a core.
Figure 10B:
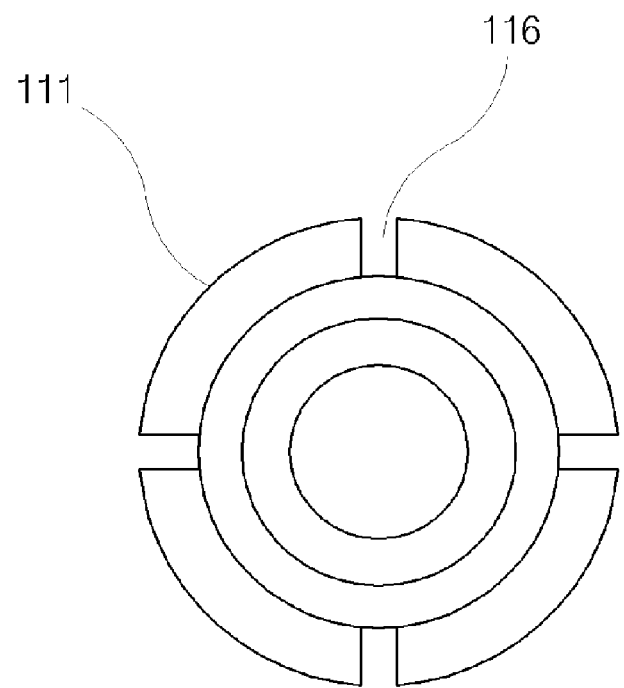
Figure 10C:
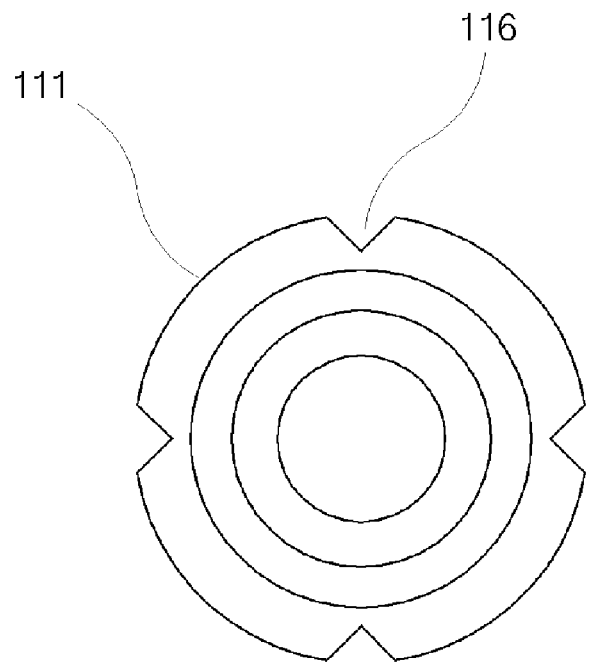
Figure 10D:
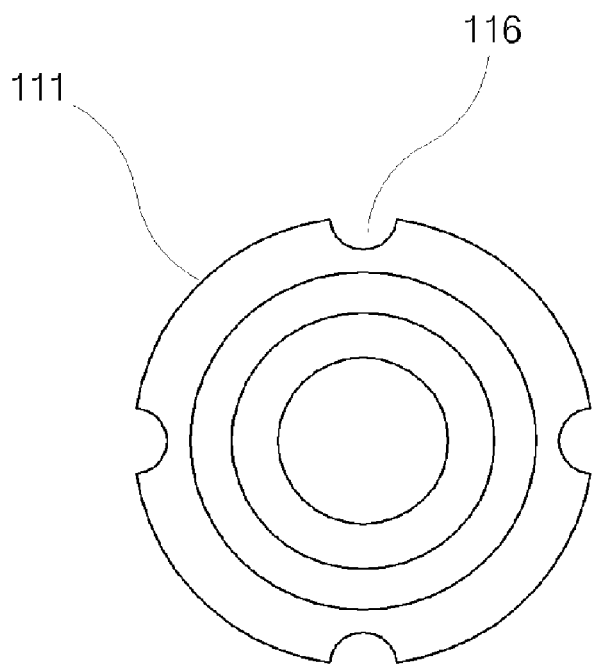

Particularly, the reduction phenomenon of the damping force is conspicuously generated in the lower speed range. That is, as shown in FIG. 9 which shows a comparison between the case that the slots 116 are formed in the core 111 and the case that the slots 116 are not formed in the core 111, if the slots 116 are formed, the intensity and increasing rate of the damping force is remarkably reduced in the lower speed range.

As described above, if the damping force in the lower speed range is lowered, it is possible to improve the driving comports.

Meanwhile, the number of the slots and a width of each slot are not limited specially. However, it is preferable that the slots are symmetrically formed with respect to center of the core 111. Also, the shape of each slot 116 is not limited specially. For example, the slot 116 may have various shapes such as a triangle, a circular arc, a quadrangle and the like, as shown in FIGS. 10A to 10D.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

According to the present invention, the reliability and stability in the coupling between the piston rod and the piston valve assembly can be increased, thereby stably controlling the damping force of the damper.

Further, the slot is formed in the core of the piston valve assembly so as to reduce the damping force in the lower speed range, thereby considerably improving the driving comport of a vehicle.

What is claimed is:

1. A piston valve assembly which is coupled to an end of a piston rod inserted into a cylinder of a continuous damping control damper, comprising:
   a core assembly which has a solenoid coil therein;
   a stopper which is fixed to the piston rod at an upper side of the core assembly, and provided with a body which is formed with a through-hole in which the piston rod is inserted, and a supporting portion which is protruded from an upper end of the body to an outside so as to have a larger diameter than the body and also have a flat upper surface;
   an upper plate which is coupled with the piston rod at an upper side of the stopper and also formed with a stopper receiving portion at a lower surface thereof, which is surface-contacted with the supporting portion of the stopper;

a lower plate which is placed at a lower side of the core assembly; and a flux ring which receives the core assembly, the upper plate and the lower plate therein, and of which an upper end supports a peripheral portion of an upper surface of the upper plate, and of which a lower end supports a peripheral portion of a lower surface of the lower plate.

2. The piston valve assembly according to claim 1, wherein a lower end of the body of the stopper is plastic-deformed and then inserted into a coupling groove formed at an outer surface of the piston rod so that the stopper is fixed to the piston rod.

3. The piston valve assembly according to claim 1, wherein the core assembly comprises:

a core comprising a winding portion, upper and lower protruded portions which are respectively formed at upper and lower ends of the winding portion to have a larger diameter than the winding portion, and a slot which is longitudinally formed at each of the upper and lower protruded portions; and a solenoid coil which is wound on the winding portion of the core.

4. The piston valve assembly according to claim 3, wherein the plurality of slots are formed at each of the upper and lower protruded portions, and each slot of the upper protruded portion and each slot of the lower protruded portion are arranged to be correspondent to each other.

* * * * *